United States Patent
Bleckmann et al.

(10) Patent No.: US 9,283,932 B2
(45) Date of Patent: Mar. 15, 2016

(54) METHOD, SYSTEM AND CONTROL DEVICE FOR ACTUATING AN IMMOBILIZER FOR TRAILER VEHICLES

(71) Applicant: WABCO GmbH, Hannover (DE)

(72) Inventors: Bjorn Bleckmann, Hannover (DE); Sven Gorczyca, Hannover (DE); David Kupka, Hildesheim (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/443,540

(22) PCT Filed: Oct. 31, 2013

(86) PCT No.: PCT/EP2013/003284
§ 371 (c)(1),
(2) Date: May 18, 2015

(87) PCT Pub. No.: WO2014/086450
PCT Pub. Date: Jun. 12, 2014

(65) Prior Publication Data
US 2015/0314751 A1 Nov. 5, 2015

(30) Foreign Application Priority Data
Dec. 7, 2012 (DE) .......................... 10 2012 023 974

(51) Int. Cl.
*B60T 13/68* (2006.01)
*B60R 25/08* (2006.01)
*B60R 25/33* (2013.01)
(Continued)

(52) U.S. Cl.
CPC .................. *B60R 25/08* (2013.01); *B60R 25/33* (2013.01); *B60T 7/16* (2013.01); *B60T 7/20* (2013.01)

(58) Field of Classification Search
CPC ........... B60R 25/08; B60R 25/33; B60T 7/20; B60T 7/16
USPC ............................................................ 701/70
See application file for complete search history.

(56) References Cited

U.S. PATENT DOCUMENTS

2004/0036350 A1   2/2004   Rowe et al.
2010/0026084 A1   2/2010   Risse et al.
2010/0304929 A1*  12/2010  Hilberer ................... B60T 7/20
                                                              477/183

FOREIGN PATENT DOCUMENTS

BE   1 015 702 A6   7/2005
DE   1 203 141       10/1965
(Continued)

*Primary Examiner* — Richard Camby
(74) *Attorney, Agent, or Firm* — Kramer Levin Naftalis & Frankel LLP

(57) ABSTRACT

To prevent the immobilizer for a trailer vehicle of a vehicle train from intervening when the trailer vehicle is moving in traffic, the electronic trailer braking system switches the vehicle service braking system into a "brake closed" or "brake released" state when the parking brake in the towing vehicle is actuated in closing direction or in release direction. The immobilizer is activated such that the electronic trailer braking system is only actuated by remote-control by a control device in order to switch the parking brake of the braking system permanently into the "brake closed" state when the trailer vehicle is decoupled from the vehicle train and is parked. The immobilizer is deactivated when the trailer vehicle is coupled to the vehicle train and the parking brake in the towing vehicle is engaged.

13 Claims, 1 Drawing Sheet

(51) Int. Cl.
*B60T 7/20* (2006.01)
*B60T 7/16* (2006.01)

(56) References Cited

FOREIGN PATENT DOCUMENTS

| DE | 10 2004 014 497 | | 11/2005 |
|---|---|---|---|
| DE | 603 11 808 | T2 | 3/2007 |
| DE | 10 2007 017 659 | A1 | 1/2008 |
| DE | 10 2006 042 925 | A1 | 3/2008 |
| EP | 1 504 975 | A1 | 2/2005 |
| EP | 2 615 000 | A1 | 7/2013 |
| GB | 2 210 342 | A | 6/1989 |
| WO | WO 94/29155 | | 12/1994 |
| WO | WO 01/44030 | A2 | 6/2001 |
| WO | WO 03/106232 | A1 | 12/2003 |
| WO | WO 2007/123490 | A1 | 11/2007 |
| WO | WO 2011/160195 | A1 | 12/2011 |

* cited by examiner

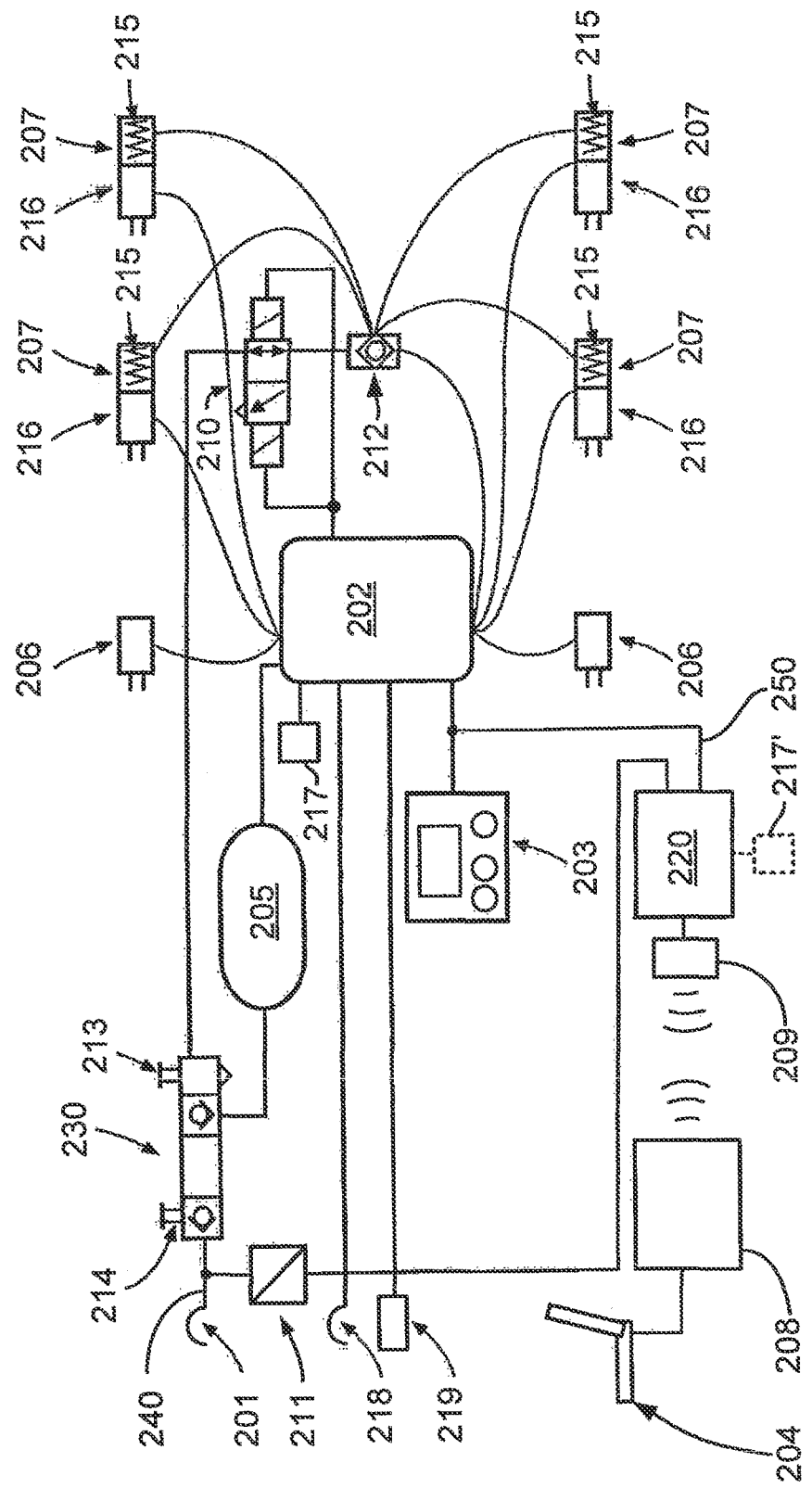

METHOD, SYSTEM AND CONTROL DEVICE FOR ACTUATING AN IMMOBILIZER FOR TRAILER VEHICLES

FIELD OF THE INVENTION

The present invention generally relates to an immobilizer for a trailer vehicle to counter unauthorized removal.

BACKGROUND OF THE INVENTION

A system for protecting against unauthorized removal of a trailer of the general type under consideration is described in Applicant's DE 10 2006 042 925 A1. The system comprises an electronic trailer braking system and also a brake assembly. An operator control device is configured to be actuated for the purpose of activating and deactivating protection against unauthorized removal of the trailer vehicle, with the result that the electronic trailer braking system is driven to effect the protection by means of the brake assembly and to apply the brakes to the trailer vehicle by means of the brake assembly in the event of unauthorized removal. The brake assembly of the trailer vehicle includes a control element that can enter at least two stable operating states. In each case, the control element remains in a stable operating state after the disconnection of the energy supply. In a first state, a spring brake is engaged. The operator control device is configured to be activated and deactivated by inputting a coded numerical value (PIN) and/or by a magnetic card and/or by a chip card and/or by means of a radio signal. This system for protection against unauthorized removal of a trailer vehicle has proved its worth but is capable of being improved with regard to operator control.

SUMMARY OF THE INVENTION

Generally speaking, it is an object of the present invention to provide an improved method, system and control device for actuating an immobilizer for trailer vehicles that are not entirely dependent on activation and deactivation by inputting a coded numerical value (PIN) and/or by a magnetic card and/or by a chip card, and that ensure that the immobilizer does not become active so long as a towing vehicle with a trailer vehicle provided with the immobilizer is moving in public road traffic.

According to an embodiment of the present invention, a method is provided for actuating an immobilizer for a trailer vehicle, which can be coupled to a towing vehicle, with an electronic trailer braking system and with a brake assembly driven by the trailer braking system and including a parking brake, wherein the electronic trailer braking system can be driven by means of a control device in order to bring about immobilization by driving the brake assembly and in order to apply the brakes on the trailer vehicle by means of the brake assembly so as to counter unauthorized removal. To effect immobilization by driving the brake assembly, and to apply the brakes on the trailer vehicle by means of the brake assembly so as to counter unauthorized removal, the electronic trailer braking system places the brake assembly in the "brake closed" state or "brake released" state when a parking brake in a towing vehicle is actuated in the closing direction or releasing direction. The immobilizer is activated such that the electronic trailer braking system is driven in a remotely controlled manner by the control device, in order to place the parking brake of the brake assembly permanently in the "brake closed" state, only when the trailer vehicle has been uncoupled from the towing vehicle and parked. The immobilizer is deactivated when the trailer vehicle is coupled to a towing vehicle and also the parking brake in the towing vehicle is engaged. The method preferably includes the following steps:

entering an activation command into a workstation, which is remote from the vehicle, transmitting the activation command to a telematics center, wirelessly sending the activation command from the telematics center to a GSM receiver or GPRS receiver on the trailer vehicle, and forwarding the activation command to the control device, storing the activation command in the control device, sensing whether the trailer vehicle is coupled to a towing vehicle or uncoupled, sensing whether the trailer vehicle is moving or stationary, and activating the electronic braking system to place the parking brake of the brake assembly permanently in the "brake closed" state when the trailer vehicle is uncoupled from the towing vehicle and is stationary.

The abbreviation GSM stands for "Global System for Mobile Communications", whereas the abbreviation GPRS signifies "General Packet Radio Service".

By virtue of these method steps, it is ensured that in normal operation whenever the driver of the vehicle actuates the parking brake in its closing direction in a towing vehicle when the vehicle is at a standstill, the immobilizer is also actuated by the electronic trailer braking system in parallel with the application of the brakes via the service brake assembly. Hence, the entire vehicle has the brakes applied and cannot be moved without the immobilizer being released. If the driver of the vehicle releases the parking brake in the towing vehicle in the normal way, the immobilizer is again enabled by the electronic trailer braking system, and the driver notices nothing of the actuation of the brake on the trailer vehicle.

If the telematics system, comprising the telematics center, which has sending capability with regard to GSM or GPRS messages, and the GSM receiver or GPRS receiver on the trailer vehicle, in the trailer vehicle receives an activation command, this request is stored in the control device connected to the receiver. So long as the vehicle is still in motion, no activation of the electronic trailer braking system is effected, in order to avoid endangering the public road traffic. Only after the trailer vehicle has been uncoupled in the normal way from the towing vehicle and is also no longer moving, e.g., the trailer vehicle has been parked at a permissible location without endangering the public road traffic, is the immobilizer activated by the activation command, and the parking brake of the trailer vehicle placed permanently into the "brake closed" state. Only when the trailer vehicle has been coupled to a towing vehicle, all the connections required for this between the towing vehicle and the trailer vehicle having been established, and the parking brake of the towing vehicle has been actuated in the closing direction, can the immobilizer be deactivated automatically or by a deactivation signal from the telematics system. If the parking brake of the towing vehicle is then released, the parking brake of the trailer vehicle is also released without the immobilizer engaging, and the vehicle consisting of the towing vehicle and the trailer vehicle can again be moved normally.

Accordingly, for deactivating the immobilizer the following command sequence can be provided:

entering a deactivation command into a workstation, which is remote from the vehicle, transmitting the deactivation command to a telematics center, wirelessly sending the deactivation command from the telematics center to a GSM receiver or GPRS receiver on the trailer vehicle, and forwarding the deactivation command to the control device, sensing whether the trailer vehicle is coupled to a towing vehicle, sensing whether the parking brake in the towing vehicle is actuated in the closing direction, deactivating the activation command when these conditions have been fulfilled, and placing the brake assembly in the "brake released" state.

According to a further embodiment of the present invention, the electronic trailer braking system can place the brake assembly of the trailer vehicle in the "brake released" state by deactivating the activation command only when the towing vehicle is recognized as a towing vehicle authorized for the towing of the trailer vehicle.

The term "authorized towing vehicle" designates a towing vehicle that is technically able to move or tow a certain trailer vehicle and also has been provided to do this on the basis of an authorization assigned to this vehicle. This authorization of the authorized towing vehicle may relate to only one special trailer vehicle or to a plurality of trailer vehicles, as will be explained further hereinafter.

The activation command is preferably capable of being coded specifically with respect to an authorized towing vehicle and/or with respect to a defined trailer vehicle, with the result that the trailer vehicle can be moved only by a certain authorized towing vehicle, in order, for example, to always couple the trailer vehicle to the relevant towing vehicle, which is moving the trailer vehicle to a predetermined destination. Specific activation commands of such a type may have been coded for an entire fleet of towing vehicles and trailer vehicles, which, for example, belongs to a logistics business.

The activation command may be entered by an operative into the stated workstation remote from the vehicle, but it may also be generated automatically by the telematics center or by the GSM receiver or GPRS receiver when the trailer vehicle has been parked at a predetermined geographical location. The presence of the trailer vehicle at this geographical location can be determined, for example, by means of a satellite-assisted navigation device.

Sensing whether the trailer vehicle has been coupled to a towing vehicle or has been uncoupled from such a vehicle can be effected by means of a coupling sensor on a coupling head for a storage pressure or in a pneumatic line between the coupling head and the trailer brake valve. Sensing whether the trailer vehicle is moving or stationary can be effected by at least one wheel rotation sensor on a wheel of the vehicle.

According to an embodiment of the present invention, a system is provided for actuating an immobilizer for a trailer vehicle that can be coupled to a towing vehicle, with an electronic trailer braking system and with a brake assembly driven by the trailer braking system and including a parking brake, wherein the electronic trailer braking system can be driven by means of a control device in order to effect immobilization by driving the brake assembly, and to apply the brakes of the trailer vehicle by means of the brake assembly so as to counter unauthorized removal. This system is characterized by a workstation, which is remote from the vehicle, is connected to a telematics center and has the purpose of entering and/or programming an activation command, by a control device on the trailer vehicle, which has been connected directly or indirectly via sensor lines or data lines to a GSM receiver or GPRS receiver and also to at least one wheel rotation sensor on the trailer vehicle and to a coupling sensor for sensing the coupling state of the trailer vehicle. The telematics center is configured to transmit the activation command in a wireless manner to the GSM receiver or GPRS receiver, the GSM receiver or GPRS receiver is configured to receive the activation command from the telematics center and to forward it to the control device for storage and further processing therein, the control device is configured to receive a signal from the coupling sensor as to whether the trailer vehicle is coupled to or uncoupled from a towing vehicle, the control device is configured to receive a signal from the wheel rotation sensor as to whether the trailer vehicle is moving or stationary, and the control device is configured to forward signals to the electronic trailer braking system of the trailer vehicle in order to effect immobilization by closing the parking brake when the trailer vehicle has been uncoupled from the towing vehicle and is stationary.

The coupling sensor may, for example, be arranged on a coupling head for a pneumatic storage pressure or in a pneumatic line between the coupling head and the trailer brake valve, and can sense the pressure applied thereto.

Moreover, the brake assembly may exhibit a bistable, electromagnetically switchable surge valve, which can assume two stable operating states in which the surge valve remains in each case after disconnection of the energy supply, wherein in a first operating state a spring-brake cylinder of the parking brake is vented.

According to an embodiment of the present invention, a control device is provided for actuating an immobilizer for a trailer vehicle, which can be coupled to a towing vehicle, with an electronic trailer braking system and with a brake assembly, which can be driven by the braking system and includes a parking brake. The electronic trailer braking system can be driven by the control device in order to effect immobilization by driving the brake assembly, and to apply the brakes to the trailer vehicle by means of the brake assembly so as to counter unauthorized removal. The control device is designed to accept, store and process an activation command received from a GSM receiver or GPRS receiver, to directly or indirectly receive and process a speed signal acquired by a wheel rotation sensor on the trailer vehicle as to whether the trailer vehicle is moving or stationary, to directly or indirectly receive and process a signal generated by a coupling sensor on the trailer vehicle as to whether the trailer vehicle is coupled to a towing vehicle or uncoupled, and to forward a signal to the electronic trailer braking system of the trailer vehicle in order to bring about immobilization by closing the parking brake when the trailer vehicle is uncoupled from the towing vehicle and is stationary.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWING

The present invention is discussed in greater detail below with reference to the accompanying drawing, in which:

FIG. 1 is a schematic representation of a system for activating an immobilizer for a trailer vehicle according to an embodiment of the present invention.

DETAILED DESCRIPTION OF THE PREFERRED EMBODIMENTS

According to the exemplary embodiment shown in FIG. 1, a trailer vehicle equipped with a system for activating an immobilizer for a trailer vehicle can be coupled to a towing vehicle via a coupling head 201 by means of a line for a pneumatic storage pressure. The towing vehicle may be, for example, a semitrailer towing vehicle or a truck, and the trailer vehicle may be a semitrailer or a drawbar trailer.

The storage pressure is conveyed to an electronic trailer braking system 202 via a trailer brake valve 230. The trailer brake valve 230 has a first actuating knob 213 for manual activation or for engaging a parking brake of the trailer vehicle. A second actuating knob 214 is provided manually releasing the automatic brake with the trailer vehicle uncoupled. The storage pressure for a storage-pressure reservoir 205 reaches a storage-pressure reservoir 205 via the coupling head 201 and a check valve integrated within the trailer brake valve 230.

The trailer vehicle or its trailer braking system 202 can be driven pneumatically via a pneumatic control line 218 and also electrically via an electrical brake line 219. Components 206 of the service brake and corresponding components 216 for the actuation of the service brake in several combination brake cylinders 207 can be driven by means of the electronic trailer braking system 202. Combination brake cylinders 207 of such type employ a spring-brake cylinder 215 and are known from DE 1 203 141 A, for example. The spring-brake cylinders 215 are integral parts of the parking brake of the trailer vehicle, which has no separate reference symbol in the single FIGURE of the drawing.

Arranged in the brake assembly is an overload-protection valve 212, which in this example consists of a 3/2-way valve. From this overload-protection valve 212, the pneumatic pressure is distributed to the spring-brake cylinders 215 of the combination brake cylinders 207.

The parking brake is moved into its closing position by actuation of the actuating knob 213. In this process, the spring-brake cylinders 215 are bled, so that the springs integrated therein actuate the wheel brakes in the closing direction. If in the case of bled spring-brake cylinders 215 the service brake is actuated, the brake pressure reaches, via the overload-protection valve 212, the spring-brake cylinders 215 of the combination cylinders 207 and therein reduces, in a manner proportional to the braking force that has been built up in the service-brake part 216 of the combination brake cylinders 207, the force in the spring-brake cylinders 215 so that no addition of force takes place.

A bistable surge valve 210 is arranged between the trailer brake valve 230 and the spring-brake cylinders 215 of the combination brake cylinders 207. The bistable surge valve 210 can assume two switching positions, between which it can be switched back and forth by means of two electromagnets. If the bistable surge valve 210 is in one of the two stable states, this state is maintained even when the bistable surge valve 210 is disconnected from the energy supply. For the purpose of switching over from a first stable state into a second stable state of the bistable surge valve 210, merely a brief surge of current or current impulse is required. A continuous supply of current is likewise possible, but not absolutely essential, in order to alternate between the two states or in order to maintain one of the two states.

In the switching state of the bistable surge valve 210 represented, the trailer brake valve 230 is connected to the overload-protection valve 212, to which compressed air is supplied either from the coupling head 201 or from the storage-pressure reservoir 205. In this manner, compressed air remains in the spring-brake cylinders 215 of the combination brake cylinders 207 or is conveyed into the spring-brake cylinders 207, and the parking brake is released. If, by virtue of a current surge, the bistable surge valve 210 is placed in the second stable state, the connecting line leading to the overload-protection valve 212 and hence also the spring-brake cylinders 215, which are connected to the overload-protection valve 212, are bled, with the result that the parking brake is engaged.

For the purpose of activating the immobilizer of the trailer vehicle, use is made of a system that includes a workstation 204 that is remote from the vehicle, for example a fixed workstation, for entering data and/or for programming by an operator, which workstation is connected to a telematics center 208. The telematics center 208 includes a transmitter with which it can send messages or signals to a trailer-side GSM receiver or GPRS receiver 209.

The GSM receiver or GPRS receiver 209 is connected via a data line to a control device 220, which is configured to store and also to process a message received from the GSM receiver or GPRS receiver 209 and conveyed to the control device 220. The control device 220 is, in addition, connected via a data line 250 to the electronic trailer braking system 202 and also connected via a sensor line to a coupling sensor 211, which, in a pneumatic pressure line 240 that extends from the coupling head 201 for storage pressure to the trailer brake valve 230, senses the pressure applied thereto. If the coupling head 201 is connected to the towing vehicle, the full pressure of the brake assembly is then applied to the trailer brake valve 230, this being reported by the coupling sensor 211 to the control device 220. From this, the conclusion is drawn therein that the trailer vehicle is coupled to the towing vehicle.

Moreover, it can be detected that the control device 220 may have been connected to a wheel rotation sensor 217' (represented in FIG. 1 by dashed lines) and transmits to the control device 220 a signal as to whether or not the wheels of the trailer vehicle are rotating, that is, whether the trailer vehicle is moving or stationary. Preferably, the wheel rotation sensor 217 is connected via a sensor line to the electronic trailer braking system 202, which forwards the determined speed values to the control device 220 via the aforementioned data line 250.

If a truck-trailer, comprising an authorized towing vehicle and a trailer vehicle, is put into service with the trailer vehicle being coupled to the towing vehicle and with the requisite connections between the towing vehicle and the trailer vehicle having been established via the coupling head 201, the pneumatic control line 218 and the electrical brake line 219, and also a deactivation command having been communicated by the workstation 204 to the GSM receiver or GPRS receiver 209 in a wireless manner via the telematics center 208, a driver of the vehicle can drive off as such when he/she releases the parking brake in the towing vehicle when the vehicle is at a standstill.

Since the brakes of the trailer vehicle were closed prior to the coupling thereof to the towing vehicle and are now still closed, for this purpose, the bistable surge valve 210 is in its second switching position in which the spring-brake cylinders 215 of the combination cylinders 207 have been bled, so that the trailer vehicle has the brakes applied. For the purpose of releasing the brakes of the trailer vehicle, on the basis of the deactivation command from the workstation 204 the bistable surge valve 210 is moved by a control command of the electronic trailer braking system 202 into its switching position shown in FIG. 1. By this, the spring-brake cylinders 215 are ventilated, and the brakes of the trailer vehicle are thereby released.

If the driver of the vehicle couples the trailer vehicle to the towing vehicle before an activation command was sent via the telematics center 208, the brake assembly of the trailer vehicle is placed in the "released" state as soon as the driver of the vehicle releases the parking brake.

If at a later time the trailer vehicle is uncoupled from the towing vehicle and the connections of the coupling head 201, of the pneumatic control line 218 and of the electrical brake line 219 to the towing vehicle are released, the coupling sensor 211 transmits a corresponding signal to the control device 220. In addition, the wheel rotation sensor 217 transmits a signal to the control device 220 to the effect that the trailer vehicle has come to a standstill. Since up until this time a connection to an authorized towing vehicle has existed, it follows from the signals of the coupling sensor 211 and of the wheel rotation sensor 217 that the trailer vehicle was parked without endangering the road traffic, and as a consequence of this an activation command stored in the control device 220 is conveyed to the electronic trailer braking system 202. The latter then generates a control command for switching the bistable surge valve 210 over into the switching position, with the result that the spring-brake cylinders 215 for the brakes of the wheels of the trailer vehicle are bled, and the brakes are closed by spring force.

If the trailer vehicle is now coupled to an unauthorized towing vehicle, and the coupling head 201, the pneumatic control line 218 and the electrical brake line 219 are connected to the unauthorized towing vehicle, the parking brake of the trailer vehicle remains engaged, since the electronic trailer braking system 202 reacts to signals from the unauthorized towing vehicle, and the bistable surge valve 210 remains in the bleed position, with the result that the parking brake of the trailer vehicle remains closed, and the trailer vehicle cannot be moved or can be moved only with difficulty.

Only when a deactivation command is entered into the workstation 204 or is generated automatically and reaches the electronic trailer braking system 202 via the telematics center 208, the GSM receiver or GPRS receiver 209 and the control device 220, is the bistable surge valve 210 switched back, after the coupling of the trailer vehicle to an appropriate authorized towing vehicle, into the position shown in FIG. 1. As a result, the spring-brake cylinders 215 are supplied with compressed air and the parking brake is released.

An additional prerequisite for releasing the immobilizer for the trailer vehicle may also be provided such that the spring-brake cylinders 215 are supplied with compressed air, in order to release the parking brake, only when the parking brake in the towing vehicle is engaged and the pressure at the coupling head 201 amounts to more than 6.5 bar, in order to prevent rolling away. This pressure acts on components 206 and 216 of the service brake of the combination cylinders 207. If the parking brake of the towing vehicle is now released, the pressure at the coupling head 201 reaches the spring-brake cylinders 215 via the bistable surge valve 210, and the truck-trailer combination comprising the towing vehicle and the trailer vehicle can be moved again.

Additional actuation of the immobilizer is also possible via an operator control device 203, which is additionally fitted to the trailer vehicle, by means of which operator control device 203 a coded numerical value (PIN) is entered into the operator control device 203 and/or a magnetic card and/or a chip card is inserted. As a result, after releasing the immobilizer, it is possible to move such a trailer vehicle, for example in a depot, by means of a marshaling vehicle.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for controlling an immobilizer for a trailer vehicle coupleable to a towing vehicle, the trailer vehicle including an electronic trailer braking system and a brake assembly driveable by the trailer braking system and having a parking brake, wherein the electronic trailer braking system is driveable by a control device to effect immobilization by driving the brake assembly and to apply the brakes on the trailer vehicle by the brake assembly to counter unauthorized removal, the method comprising placing the brake assembly in one of a brake closed state and a brake released state when a parking brake in the towing vehicle is actuated in one of a closing direction and releasing direction; activating the immobilizer such that the electronic trailer braking system is driven, remotely controlled by the control device, to place the parking brake of the brake assembly permanently in the brake closed state only when the trailer vehicle has been uncoupled from the towing vehicle and parked; and deactivating the immobilizer when the trailer vehicle has been coupled to the towing vehicle and the parking brake in the towing vehicle has been applied.

2. The method as claimed in claim 1, further comprising:
providing an activation command at a remote workstation;
transmitting the activation command to a telematics center;
wirelessly sending the activation command from the telematics center to at least one of a GSM receiver and a GPRS receiver on the trailer vehicle, and forwarding the activation command to the control device;
storing the activation command to the control device;
determining whether the trailer vehicle is coupled to the towing vehicle or uncoupled;
determining whether the trailer vehicle is moving or stationary; and
activating the electronic trailer braking system to place the parking brake of the brake assembly permanently in the brake closed state when the trailer vehicle is uncoupled from the towing vehicle and is stationary.

3. The method as claimed in claim 2, further comprising:
providing a deactivation command at the remote workstation;
transmitting the deactivation command to a telematics center;
wirelessly sending the deactivation command from the telematics center to at least one of a GSM receiver and a GPRS receiver on the trailer vehicle, and forwarding the deactivation command to the control device;
determining whether the trailer vehicle is coupled to the towing vehicle;
determining whether the parking brake in the towing vehicle is actuated in the closing direction;
deactivating the activation command when the trailer vehicle is coupled to the towing vehicle and the parking brake in the towing vehicle is actuated in the closing direction; and
placing the brake assembly in the brake released state.

4. The method as claimed in claim 3, wherein placing the brake assembly in the brake released state is effected only when the towing vehicle is recognized as a towing vehicle authorized for towing the trailer vehicle.

5. The method as claimed in claim 4, wherein the activation command is coded specifically with respect to at least one of an authorized towing vehicle and a defined trailer vehicle.

6. The method as claimed in claim 4, wherein the activation command is one of a plurality of specific activation commands coded for a fleet of towing vehicles and trailer vehicles.

7. The method as claimed in claim 2, wherein the activation command is generated automatically when the trailer vehicle is parked at a preselected geographical location.

8. The method as claimed in claim 2, wherein determining whether the trailer vehicle is coupled to the towing vehicle or uncoupled is effected by coupling sensor on a coupling head for a storage pressure or in a pneumatic line between the coupling head and a trailer brake valve.

9. The method as claimed in claim 2, wherein determining whether the trailer vehicle is moving or stationary is effected by at least one wheel rotation sensor.

10. A system for controlling an immobilizer for a trailer vehicle coupleable to a towing vehicle, the trailer vehicle including an electronic trailer braking system and a brake assembly driveable by the trailer braking system and having a parking brake, wherein the electronic trailer braking system is driveable by a control device to effect immobilization by driving the brake assembly and to apply the brakes on the trailer vehicle by the brake assembly to counter unauthorized removal, the system comprising a remote workstation in communication with a telematics center for providing an activation command; and a control device on the trailer vehicle, the control device being connected one of directly and indirectly via one of sensor lines and data lines to a GSM receiver or a GPRS receiver, to at least one wheel rotation sensor on the trailer vehicle, and to a coupling sensor on the trailer vehicle; wherein the telematics center is configured to wirelessly transmit the activation command to the GSM receiver or GPRS receiver; wherein the GSM receiver or GPRS receiver is configured to receive the activation command from the telematics center and forward it to the control device for storage and further processing; and wherein the control device is configured to receive a signal from the coupling sensor as to whether the trailer vehicle is coupled to the towing vehicle or uncoupled, to receive a signal from the wheel rotation sensor as to whether the trailer vehicle is moving or stationary, and to forward a signal to the electronic trailer braking system of the trailer vehicle to effect immobilization by closing the parking brake when the trailer vehicle has been uncoupled from the towing vehicle and is stationary.

11. The system as claimed in claim 10, wherein the coupling sensor is arranged on a coupling head for a pneumatic storage pressure or in a pneumatic line between the coupling head and a trailer brake valve.

12. The system as claimed in claim 10, wherein the brake assembly has a bistable, electromagnetically switchable surge valve configured to assume two stable operating states in which the surge valve remains in each case after disconnection of an energy supply.

13. A control device for controlling an immobilizer for a trailer vehicle coupleable to a towing vehicle, the trailer vehicle including an electronic trailer braking system and a brake assembly driveable by the braking system and having a parking brake, wherein the electronic trailer braking system is driveable by the control device to effect immobilization h driving the brake assembly and to apply the brakes to the trailer vehicle by the brake assembly to counter unauthorized removal, the control device being configured to accept, store and process an activation command received from a GSM receiver or a GPRS receiver, directly or indirectly receive and process a rotational speed signal acquired by a wheel rotation sensor on the trailer vehicle as to whether the trailer vehicle is moving or stationary, directly or indirectly receive and process a signal generated by a coupling sensor on the trailer vehicle as to whether the trailer vehicle has been coupled to the towing vehicle or uncoupled, and forward signals to the electronic trailer braking system of the trailer vehicle to effect immobilization by closing the parking brake when the trailer vehicle is uncoupled from the towing vehicle and is stationary.

* * * * *